United States Patent [19]

Stahl

[11] Patent Number: 5,274,817
[45] Date of Patent: Dec. 28, 1993

[54] METHOD FOR EXECUTING SUBROUTINE CALLS

[75] Inventor: Alan L. Stahl, Peoria, Ill.

[73] Assignee: Caterpillar Inc., Peoria, Ill.

[21] Appl. No.: 812,445

[22] Filed: Dec. 23, 1991

[51] Int. Cl.[5] .......................... G06F 7/00; G06F 15/00
[52] U.S. Cl. .................................... 395/700; 395/650;
364/280; 364/281.3
[58] Field of Search ............... 395/375, 400, 650, 700,
395/800, 775

[56] References Cited

U.S. PATENT DOCUMENTS

| | | | |
|---|---|---|---|
| 4,488,227 | 12/1984 | Miu et al. | 395/375 |
| 4,841,434 | 6/1989 | Mathewes, Jr. et al. | 395/375 |
| 4,942,524 | 7/1990 | Nunomura | 395/425 |
| 5,220,669 | 6/1993 | Barn et al. | 395/775 |

Primary Examiner—Kevin A. Kriess
Assistant Examiner—Kevin Spivak
Attorney, Agent, or Firm—Kirk A. Vander Leest; R. Carl Wilbur

[57] ABSTRACT

A method is provided for executing a subroutine in a computer which includes a memory and a stack. The memory has a plurality of sequentially ordered memory address locations referenced by respective address codes. The subroutine is stored in a preselected range of memory locations. The method includes storing a signature word on the stack, the signature word corresponding to an entry address code in memory for the subroutine; storing a return address on the stack, the return address code corresponding to a memory location where control is to be passed after execution of the subroutine; passing control to the subroutine entry address; executing the subroutine; comparing the signature word stored on the stack with the subroutine entry address code; passing control to the return address if the compared values are equal; and executing a software interrupt if the compared values are not equal.

8 Claims, 4 Drawing Sheets

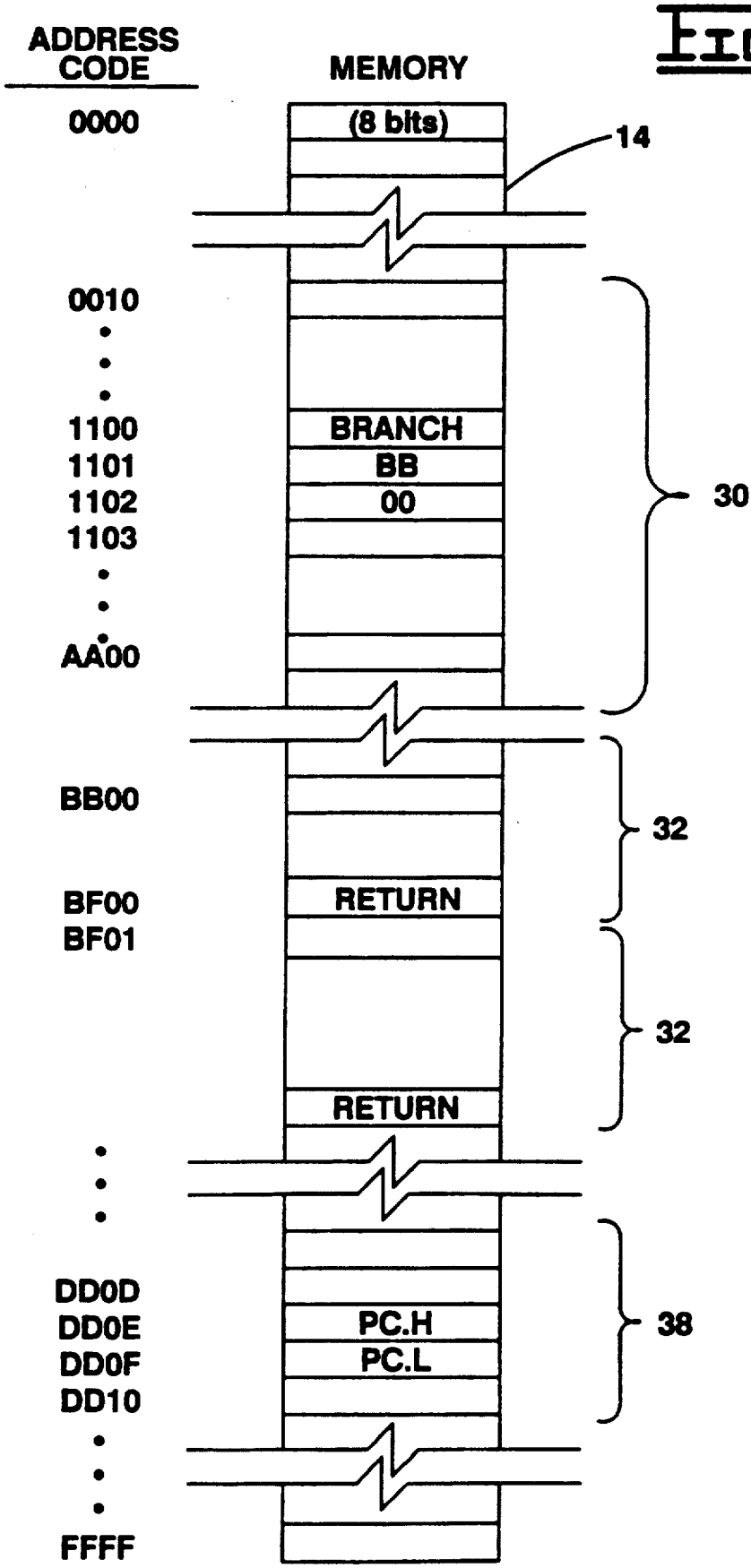

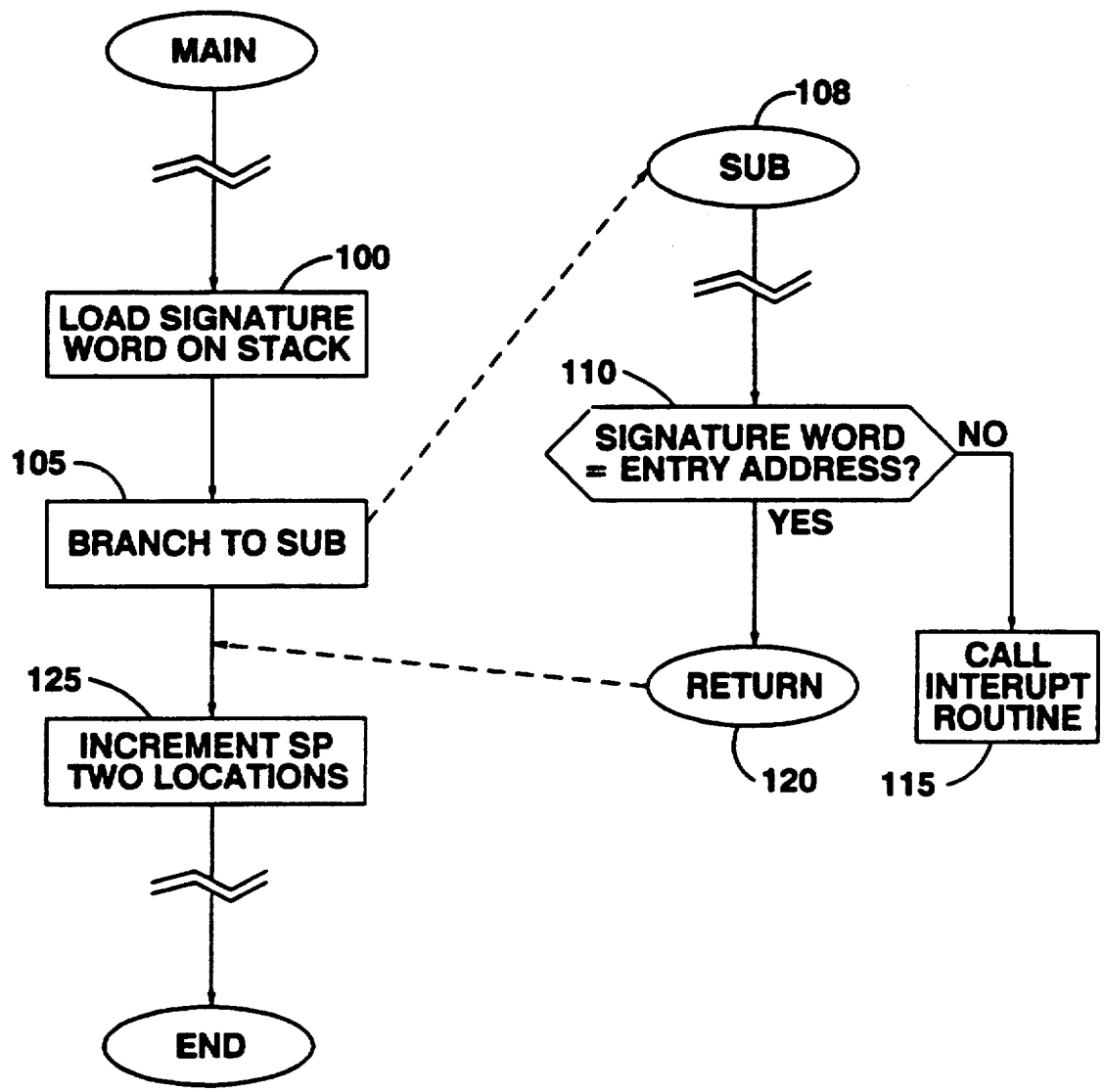
Fig_3_

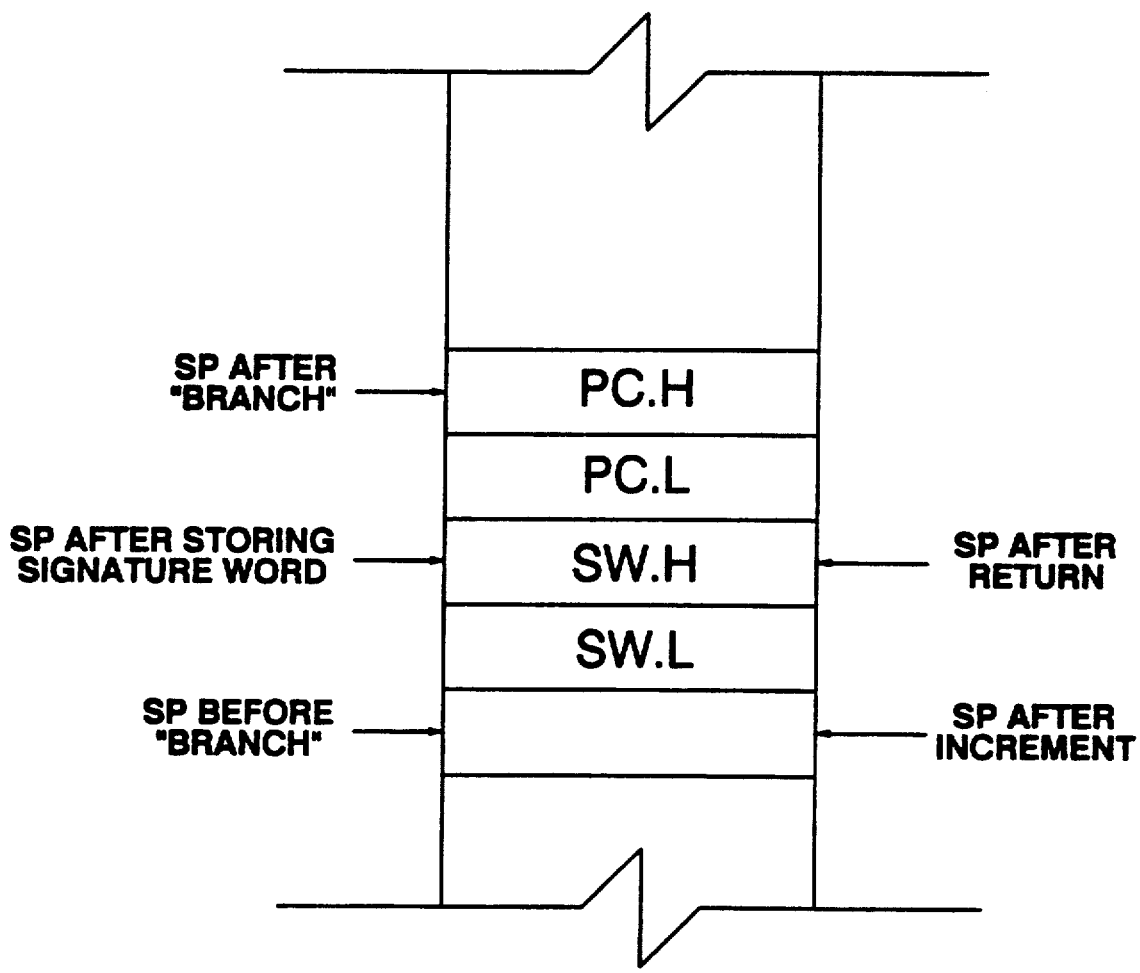
Fig_4_

METHOD FOR EXECUTING SUBROUTINE CALLS

DESCRIPTION

1. Technical Field

This invention relates generally to computer programming and, more specifically, to a method for verifying stack integrity after performing subroutine calls.

2. Background Art

It is common to employ microprocessor based control systems in vehicles for controlling a variety of vehicle functions such as braking, engine speed regulation, transmission shifting. As should be apparent, when a computer is employed in such applications, it is highly desirable that all potential malfunctions be eliminated.

However, in the past at least two problems have been known to occur which can adversely affect program execution, thereby causing the control system to malfunction. First, it is possible for the program counter to be disturbed by electrical interference, for example. If this occurs, the normal flow of the program can be disturbed. Second, it is common to divide the software into a main program and a plurality of subroutines. Control is transferred from the main program to the subroutine implementing a branch-to-subroutine or jump-to-subroutine instruction, hereinafter referred to generically as a branch instruction. Control is returned to the main program using a "return" instruction or similar control instruction. In most microprocessors, execution of a subroutine call involves manipulation of a software stack on a last-in, first-out, method. More specifically, when a subroutine is called, the return address in the main program is pushed onto the stack. In order to ensure proper program execution, it is crucial that the integrity of the stack be maintained. However, due to electromagnetic interference, for example, it is possible for the stack pointer to be disturbed. If this occurs, control can be returned to an incorrect location when a return instruction is executed. As should be apparent, in many applications such as a vehicle braking system, such program malfunctions are highly undesirable. However, known control systems do not provide a method for detecting either of these fault conditions.

The present invention is directed to overcoming one or more of the above problems.

DISCLOSURE OF THE INVENTION

A method is provided for executing a subroutine in a computer which includes a memory and a stack. The memory has a plurality of sequentially ordered memory address locations referenced by respective address codes. The subroutine is stored in a preselected range of memory locations. The method includes storing a signature word on the stack, the signature word corresponding to an entry address code in memory for the subroutine; storing a return address on the stack, the return address code corresponding to a memory location where control is to be passed after execution of the subroutine; passing control to the subroutine entry address; executing the subroutine; comparing the signature word stored on the stack with the subroutine entry address code; passing control to the return address if the compared values are equal; and executing a software interrupt if the compared values are not equal.

BRIEF DESCRIPTION OF THE DRAWINGS

FIG. 2 illustrates data stored in a memory of the computer of FIG. 1;

FIG. 3 is a flowchart for implementing the immediate invention; and

FIG. 4 illustrates manipulation of the data stack during operation of the present invention.

BEST MODE FOR CARRYING OUT THE INVENTION

Figure 1:
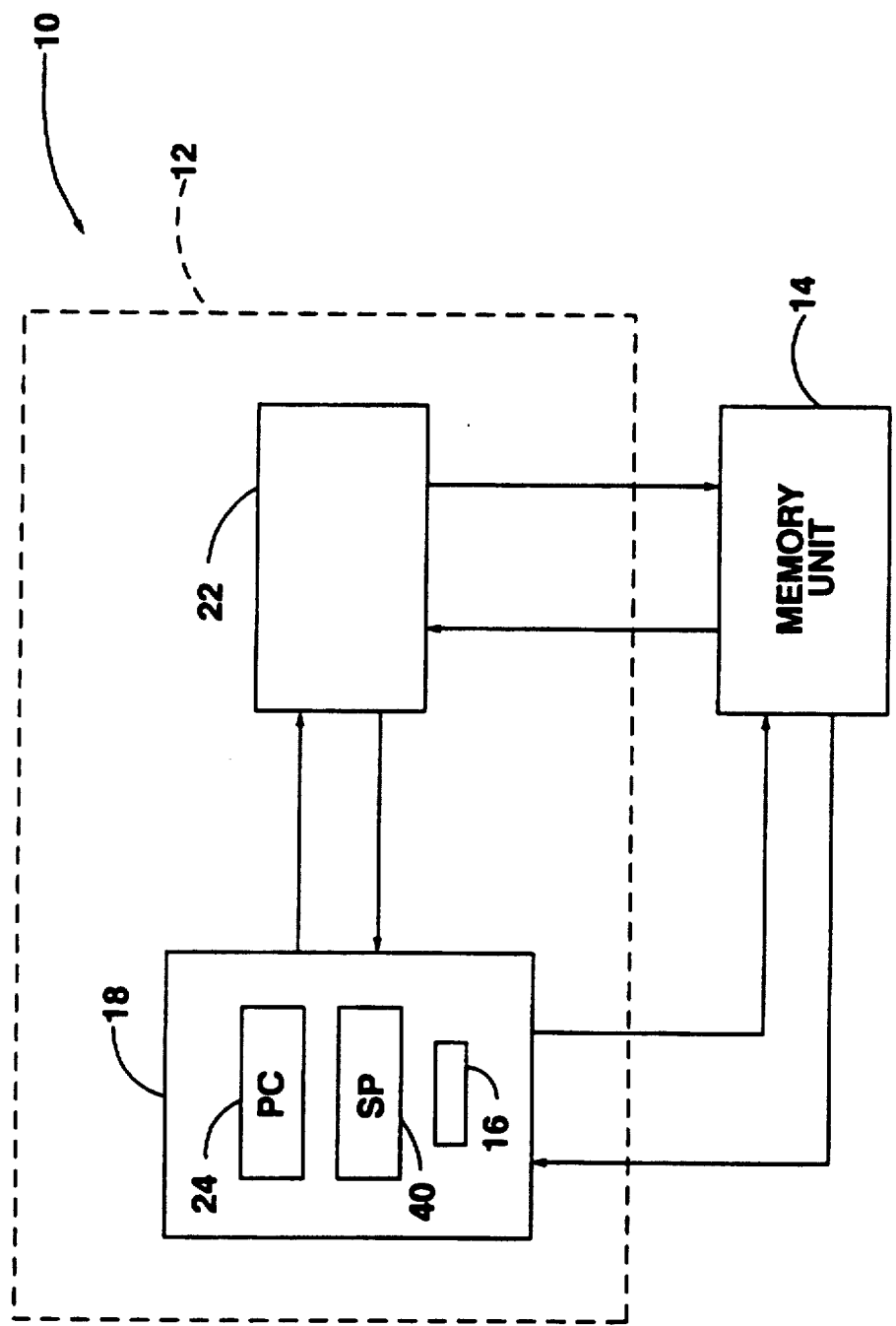
FIG. 1 is a block diagram of a computer for implementing the present invention.

Referring now to FIG. 1, there is shown in block form a computer 10. The computer 10 includes a central processor unit 12 (CPU) in the form of a commercially available microprocessor. In the preferred embodiment, the CPU 12 is a series MC6800 microprocessor as is manufactured by Motorola Semiconductor, Inc. of Phoenix, Ariz. However, it should apparent that the present invention can be used in connection with numerous other microprocessors, such as the series 286, 386 or 486 microprocessors as manufactured by the Intel Corporation.

The computer 10 includes a main memory 14 for storing operating instructions. The memory 14 consists of a series of sequential memory locations in which operating instructions are stored (see FIG. 2.) In the case of the MC6809 microprocessor, the memory is a 64 kilobite memory, wherein there are 65,536 memory locations of 8 bits each. Each of the memory locations is referenced by a corresponding address code.

The CPU 12 includes a control unit 18, and an arithmetic processing unit 22. The control unit 18 is provided for supervising and controlling data flow between the processing unit 22 and memory unit 14 as is well known in the art. The processing unit 22 retrieves instructions from the memory unit 14 under control of the control unit 18 and performs the operation represented by the retrieved instruction.

The control unit 18 includes a plurality of registers which are indicated generally by reference numeral 16. A program counter (PC) 24 is provided for storing the address code of the location in the memory 14 which contains the next instruction to be executed. Each time a new instruction is to be retrieved from the memory 14, the address of the retrieved instruction is obtained from the program counter 24. Normally instructions are retrieved from successive locations and, hence, the program counter 24 is usually sequentially incremented to point to the next sequential location in memory upon retrieval of the current operating instruction.

However, microprocessors are also provided with instructions for enabling nonsequential program execution. For example, in the series MC6809 microprocessors, nonsequential program execution can be effected using a branch instruction. Similar instructions are provided in other microprocessors, as would be apparent to one skilled in the art. Such instructions are typically used in calling subroutines. More specifically, the memory 14 is typically divided into a a main program 30 and a plurality of subroutines 32. The subroutines 32 are provided for program modularity and for performing operations which are required numerous times during execution of the main program, for example.

When a subroutine 32 is called using a branch instruction, the address location where the subroutine begins is loaded into the program counter 24. For example, in FIG. 2 a subroutine starts at address location BB00. A branch instruction is stored in location 1100 of the main program and the 16-bit address location of the subroutine is stored as two bytes (8 bits) in the next two memory locations. When the branch instruction is encountered, the starting address of the subroutine is moved into the program counter 24, causing control to branch to the subroutine. The computer 10 will sequentially execute the instructions contained in the subroutine until a return instruction is encountered. The return instruction indicates that control is to be returned to the memory location which immediately follows the branch instruction which was used to call the subroutine. In the example, this corresponds to memory location BF00.

For this purpose, the memory 14 also includes a stack 38 for stacking data using a last-in, first-out (LIFO) method, as is common in the art. A stack pointer (SP) 40 is provided for pointing to the highest location of data stored in the stack 38. The stack pointer 40 is a 16-bit register in the control unit 18 whose contents determine the location where data is to be loaded onto the stack 38. In the case of the MC6809 microprocessor, the stack pointer 38 always points to the last stored data or the "top" of the stack as it is referred to in the art. When data is loaded onto the stack 38, it is essentially "stacked" onto the data already stored in the stack 38. This operation is referred to as "pushing" data onto the stack. Prior to pushing the data onto the stack, the MC6809 automatically decrements the stack pointer 40 to point to next available address location on the stack 40. The data is then pushed onto the stack at this location, hence the stack pointer 40 points at the address location of the newly stored data. As data is removed, or pulled from the stack 38, the stack pointer 40 is incremented to point at the next available data. It should be noted that the location of the stack 38 in FIG. 2 is only illustrative and that the size of the stack 38 will depend on the amount of data stored on the stack 38 at any given time. Moreover, it should be noted that in some microprocessors, such as the MC6800 as manufactured by Motorola, the stack pointer normally points to the next empty stack location. In such microprocessors, data is pushed onto the stack 38 at this location and the stack pointer 40 is automatically decremented to point to the next empty location on the stack 38. Although the invention is only described in connection with the stack manipulation as implemented by the MC6809, it should be apparent that the invention is equally applicable to other microprocessors such as the MC6800.

Manipulation of the stack 38 during a typical prior art branch to a subroutine will now be explained. When execution of the main program begins, the stack pointer 40 is initialized to point to the first location of the stack 38 in memory 14. In FIG. 2, the stack 38 starts at address code DD10. When a branch instruction is executed in the main program 30, the address of the memory location immediately following the branch instruction (i.e., the return address) is stored, or "pushed" onto the stack 38. Since the memory 14 is only 8 bits long and the address code is 16 bits, the return address is divided into two bytes. These two bytes are shown as PC.U and PC.L referring to the upper and lower eight bits of the return address, respectively. Initially, the stack pointer 40 is decremented to DD0F, and PC.L is pushed onto the stack 38 at that address. The stack pointer 40 is then decremented to DD0E, and PC.H is pushed onto the stack 38 at that location. When a return instruction is subsequently encountered in the subroutine 30, the return address is pulled from the stack 38. The return instruction also causes the stack pointer 40 to be incremented so that it continues to point to the top of the stack 38 (address DD10 in the example.)

In past computer systems, at least two problems have been known to occur. First, it is possible for the contents of the stack pointer 40 to be disturbed by electromagnetic interference, for example. If this occurs, control can be returned to an incorrect location when a return instruction is executed. Additionally, it is possible for the program counter 24 to be disturbed by electrical interference. If this occurs, the normal flow of the program can be disturbed. As should be apparent, in many applications such as a vehicle braking system, such program malfunctions are highly undesirable. However, known control systems do not provide a method for detecting either of these fault conditions.

Hence, the immediate invention is provided for ensuring that the integrity of the stack 38 is maintained during program execution. Referring now to FIG. 3, a flowchart illustrating a computer software program for implementing the preferred embodiment of the present invention will be discussed. The program depicted in this flowchart is particularly well adapted for use with the microprocessor and associated components described above, although any suitable microprocessor may be utilized in practicing an embodiment of the present invention. This flowchart constitutes a complete and workable design of the preferred software program, and has been reduced to practice on the series MC6809 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

FIG. 3 includes a portion of a main program illustrating steps to be performed each time a branch to a subroutine is desired. While these steps are illustrated as being a portion of the main program, it should be apparent that these steps are to be executed during all branch operations, including those performed within various subroutines (i.e., nested subroutines.) Initially, in the block 100 a signature word is loaded onto the stack 38. The signature word corresponds to the starting or entry address of the subroutine which is being called. For example, if the subroutine starts at address location BB00, the signature word will be BB00. Manipulation of the stack 38 during this operation is illustrated in FIG. 4. Since the memory 14 is only 8 bits long, the signature word is stored as two bytes which are indicated as SW-H and SW-L. Initially, the stack pointer 40 points to the top of the stack. When the 16 bit signature word is stored on the stack 38, the stack pointer 40 is decremented two positions so that it points to the first byte of the signature word or SW-H.

Next, in the block 105 a branch to the subroutine is executed. When the branch instruction is executed, the return address (PC.H, PC.L) is stored onto tne stack 38 as explained above. This operation also causes the stack pointer 40 to be decremented to point to the resulting top of the stack or the location where PC.H is stored in FIG. 4.

Control is then passed to the starting address of the subroutine. The control then executes the subroutine by sequentially processing the instructions in the subroutine. The substantive instructions of the subroutine have been omitted since the present invention can be used in any subroutine. As was explained above, in known subroutines, control is passed back the main program using a return instruction following execution of the substantive steps of the subroutine. However, in the present invention the functions of blocks 110 and 115 have been added. More specifically, in the block 110 it is determined if the signature word (SW.H, SW.L) stored on the stack 38 matches the entry address of the subroutine which was just executed. If the value of the stack pointer 40 has been erroneously changed by electromagnetic interference, for example, the compared values will not match. If the compared values do not match, it is assumed that an error has occurred and control is passed to the block 115 where a software interrupt is executed. In the preferred embodiment, the software interrupt causes all outputs of the computer to be set to zero until the watchdog timer resets the control. Alternatively, the computer 10 could be programmed to reset the stack pointer 40 to its initial address and restart execution of the MAIN program. The exact nature of the software interrupt is a matter of design choice and, hence, no further detail is provided herein.

Conversely, if the stack pointer 40 has not been disturbed, the check in block 110 is answered in the affirmative and control is passed to the block 120. In the block 120, a return instruction is executed, causing control to be passed back to the main program. More specifically, when the return instruction is encountered, the return address is retrieved from the stack 38. After this operation is performed, the top of the stack will be at the upper byte of the signature word (SW.H). Hence, in the block 125, the stack pointer 38 is incremented two address locations, thereby restoring the stack 38 to its location prior to the branch operation.

It should be noted that the above test will also detect erroneous changes in the program counter 24 which result in incorrect execution of a subroutine. For example, if a portion of the main program is being executed it could be possible for the program counter 38 to erroneously change such that control is incorrectly passed to one of the subroutines. When this occurs the check in block 110 will be answered in the negative because the signature word will not have been stored on the stack 38. The interrupt routine will be responsively executed, thereby preventing further harm due to the erroneous change in the program counter 38.

In MC6809 assembly language, the operations described in connection with FIG. 3 can be performed by the following programming steps:

| Source Statment | | | Block in FIG. 4A |
|---|---|---|---|
| | LDX | #ADRS.S | 100 |
| | STX | 0,-S | 100 |
| | LBSR | ADRS.S | 105 |
| | . | | |
| | . | | |
| | . | | |
| | LDX | #ADRS.S | 110 |
| | CMPX | 2,S | 110 |
| | BEQ | 99S | 110 |
| | SWI | | 115 |
| 99S | RTS | | 120 |
| | LEAS | 2,S | 125 |

More specifically, in block 100, the entry address (ADRS.S) of the subroutine is loaded into the X register using the load instruction (LDX.) Additionally in the block 100 the contents of the X register, i.e., the entry address (ADRS.S), is pushed onto the stack 38 using the store instruction (STX.)

Next, in the block 105, control is passed to the entry address (ADRS.S) using the branch instruction (LBSR.) The substantive portion of the subroutine is then executed. Upon execution of the subroutine, control is passed to the block 110 where the entry address (ADRS.S) is again loaded into the X register using the load instruction (LDX.)

A compare instruction (CMPX) is then executed to determine if the signature word (SW.H, SW.L) matches the subroutine entry address (ADRS.S.) The compare instruction (CMPX) is structured to compare the contents of the X register to the data stored on the stack 38 at two locations lower than the present position of the stack pointer 40. If the stack pointer 40 is at the correct location, the signature word (SW.H, SW.L) will stored in this location. If the compared values are equal, control is passed to the block 120 using the branch-if-equal instruction (BEQ.)

In the block 120 control is returned to the main program using the return instruction (RTS.) Execution of the return instruction (RTS) causes the stack pointer 40 to be incremented two address locations, as was explained above. The location of the stack pointer 40 after the return instruction (RTS) is illustrated in FIG. 4. Next in the block 125, the signature word (SW.H, SW.L) is essentially removed from the stack 38 using a load effective address instruction (LEAS.) This command causes the stack pointer (40) to be incremented two address locations such that it points to the same location as it did prior to storing the signature word on the stack 38.

Conversely, if the values compared using the compare instruction (CMPX) are not the same, it is assumed that a stack error has occurred and control is passed to the block 115. In the block 115 a software interrupt (SWI) to be executed, as explained above.

INDUSTRIAL APPLICABILITY

Assume that the computer 10 is installed on a work vehicle (not shown) such a track type loader. The vehicle is equipped with a hydrostatic drive system including left and right drive motors for driving left and right tracks on the vehicle. The vehicle also includes an electro-hydraulic control system for sensing the position of control elements such as steering pedals and a speed/direction lever and responsively controlling the speeds of the drive motors.

The control system described therein includes a computer 10 programmed to receive electrical inputs from the control elements and process these inputs to produce control signals for controlling the speeds of the drive motors. Additionally, the control system includes a calibration routine which enables the operator to synchronize the speeds of the individual drive motors by overwriting data stored in memory. The calibration routine is contained in nested subroutines which are only supposed to be executed when a calibration switch is located in an "ON" position. If the subroutines are called using branch operations structured in accordance with prior subroutine branches, it could be possible for the calibration routine to be erroneously executed. More specifically, if the program counter 24 is disturbed during vehicle operation, control could inadvertently be passed to the subroutine control. In past systems, this error would not be detected. However, by implementing the branch to the calibration subroutine in accordance with the present invention, inadvertent executions of the calibration routine will be detected when the return instruction is executed, as was explained above.

Other aspects, objects and advantages can be obtained from a detailed study of the drawings, disclosure and appended claims.

What is claimed is:

1. A method for executing a subroutine in a computer which includes a memory and a stack, the memory having a plurality of sequentially ordered memory address locations referenced by respective address codes, the subroutine being stored in a preselected range of memory locations, comprising the steps of:
   storing a signature word on the stack, the signature word corresponding to an entry address code in memory for the subroutine;
   storing a return address on the stack, the return address code corresponding to an memory location where control is to be passed after execution of the subroutine;
   passing control to an entry address of the subroutine;
   executing the subroutine;
   comparing the signature word stored on the stack with the subroutine entry address;
   passing control to the return address if the compared values are equal; and
   executing a software interrupt if the compared values are not equal.

2. A method as set forth in claim 1, further comprising the step of removing the signature word from the stack if the compared values are equal.

3. A method for executing a subroutine in a computer which includes a memory and a stack, the memory having plurality of sequentially ordered memory address locations referenced by respective address codes, the subroutine being stored in a preselected range of memory locations, comprising the steps of:
   storing a signature word on the stack, the signature word corresponding to an entry address code in memory for the subroutine;
   executing a branch instruction, the branch instruction causing control to be passed to the subroutine, the branch instruction further causing a return address code to be stored on the stack, the return address code corresponding to an memory location where control is to be passed after execution of the subroutine;
   executing the subroutine;
   comparing the signature word stored on the stack with the subroutine entry address code;
   passing control to the return address if the compared values are equal; and
   executing a software interrupt if the compared values are not equal.

4. A method as set forth in claim 3, further comprising the step of removing the signature word from the stack if the compared values are equal.

5. A method for calling a subroutine from a main program in a computer which includes a memory and a stack, the memory having plurality of sequentially ordered memory address locations referenced by respective address codes, the main program being stored in a first preselected range of memory locations, the subroutine being stored in a second preselected range of memory locations, comprising the steps of:
   storing a signature word on the stack, the signature word corresponding to an entry address code for the subroutine;
   executing a branch instruction, the branch instruction causing control to be passed to the subroutine, the branch further causing a return address code to be stored on the stack, the return address code corresponding to an memory location in the main program where control is to be passed after execution of the subroutine;
   executing the subroutine;
   comparing the signature word stored on the stack with the subroutine entry address code;
   passing control to the return address if the compared values are equal; and
   executing a software interrupt if the compared values are not equal.

6. A method as set forth in claim 5, further comprising the step of removing the signature word from the stack if the compared values are equal.

7. A method for executing a subroutine in a computer which includes a memory, a stack and a stack pointer, the memory sharing plurality of sequentially ordered memory locations referenced by respective address codes, the stack being stored in portions of the memory on a last-in (LIFO) basis wherein elements wherein elements stored on the stack are placed in memory locations having sequentially lower address codes, the stack pointer providing the address code of the last element stored on the stack, the subroutine being stored in a preselected range of memory locations; comprisng the steps of:
   storing a signature word on the stack, the signature word corresponding to an entry address code in memory for the subroutine;
   executing a branch instruction, the branch instruction causing control to be passed to the subroutine entry address, the branch instruction further causing a return address code to be stored on the stack, the return address code corresponding to an memory location where control is to be passed after execution of the subroutine;
   executing the subroutine;
   comparing the signature word stored on the stack with the subroutine entry address code;
   interrupting program operation if the compared values are not equal;
   executing a return instruction if the compared values are equal, the return instruction causing control to be passed to the return address; and
   removing the signature word from the stack if the return command is executed.

8. A method as set forth in claim 7 wherein the signature word is removed from the stack by incrementing the stack pointer two address locations.

* * * * *

UNITED STATES PATENT AND TRADEMARK OFFICE
CERTIFICATE OF CORRECTION

PATENT NO. : 5,274,817
DATED : December 28, 1993
INVENTOR(S) : Alan L. Stahl

It is certified that error appears in the above-identified patent and that said Letters Patent is hereby corrected as shown below:

In claim 5, column 8, line 12, after "branch", add --instruction--.

In claim 7, column 8, line 30, after "memory", delete "sharing" and add --having--.

In claim 7, column 8, line 33, after "last-in", add --first-out--.

Signed and Sealed this

Eighteenth Day of October, 1994

Attest:

BRUCE LEHMAN

Attesting Officer      Commissioner of Patents and Trademarks